N. E. SHERWOOD.
SWIVEL HOOK.
APPLICATION FILED NOV. 5, 1913. RENEWED JUNE 18, 1915.
1,150,892. Patented Aug. 24, 1915.
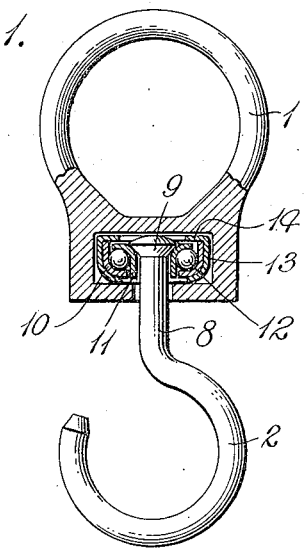
Fig. 1.
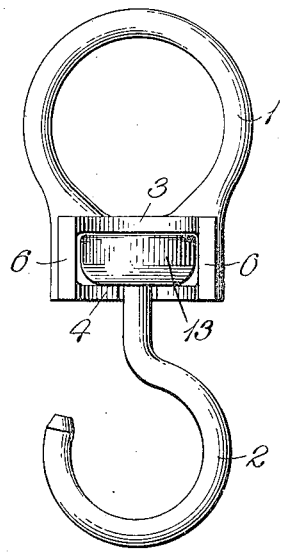
Fig. 2.
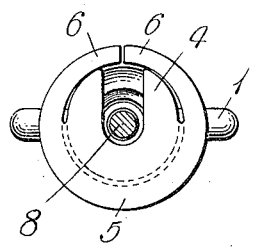
Fig. 3.
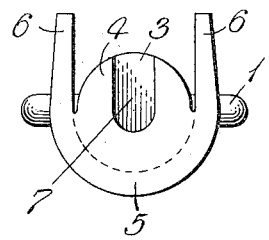
Fig. 4.
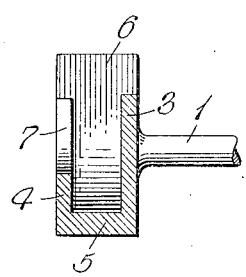
Fig. 5.
Witnesses
Chas. W. Stauffiger
Anna M. Dorr
Inventor
Nathan E. Sherwood,
By
Attorneys

UNITED STATES PATENT OFFICE.

NATHAN E. SHERWOOD, OF DETROIT, MICHIGAN.

SWIVEL-HOOK.

1,150,892.　　　　Specification of Letters Patent.　　Patented Aug. 24, 1915.

Application filed November 5, 1913, Serial No. 799,273. Renewed June 18, 1915. Serial No. 34,958.

*To all whom it may concern:*

Be it known that I, NATHAN E. SHERWOOD, a citizen of the United States of America, residing at Detroit, in the county of Wayne and State of Michigan, have invented certain new and useful Improvements in Swivel-Hooks, of which the following is a specification, reference being had therein to the accompanying drawings.

This invention relates to a ball bearing swivel especially designed for hand rope and wire cabling machines, wherein a swivel having an eye at one end thereof and a hook at the opposite end is employed for establishing a non-frictional and rotatable connection between a suspended weight and the end of a rope or cable in the process of making.

The primary object of my invention is to provide a ball bearing swivel embodying an eye member having provision to accommodate the end of a hook member, which is provided with anti-frictional means for movably supporting the hook relatively to the eye member.

A further object of this invention is to provide a hook with a self-contained anti-frictional bearing that can be easily and quickly housed to swivel or revolubly support the hook, whereby the hook can be revolved relatively to its anchoring means.

A further object of this invention is to provide a swivel hook and eye consisting of comparatively few parts that are simple in construction, durable, easy to assemble and highly efficient for the purposes for which they are intended.

I attain the above and other objects by a mechanical construction that will be hereinafter specifically described and then claimed, and reference will now be had to the drawings, wherein, Figure 1 is a plan of the ball bearing swivel partly broken away and partly in section; Fig. 2 is a plan of the same illustrating the housing in an open position; Fig. 3 is an end view of the eye member of the swivel showing the malleable lugs of the housing in a closed position; Fig. 4 is a similar view showing the lugs in an open position, and Fig. 5 is a longitudinal sectional view of a portion of the eye member.

A ball bearing swivel in accordance with this invention comprises an eye member 1 and a hook member 2. The eye member 1 is provided with a cylindrical housing having circular end walls 3 and 4, a semi-cylindrical bottom wall 5 and malleable lugs 6 formed integral with the bottom wall 5 and adapted to be bent inwardly over the upper edges of the end walls 3 and 4 to form a top wall coöperating with the remainder of the walls in forming an inclosure. The end wall 4 is provided with a vertical slot 7 to receive the shank 8 of the hook member 2. The end of the shank 8 is upset or headed, as at 9 and movably mounted upon the shank 8 against the head thereof is a self-contained anti-frictional connecting member that is movably held within the housing by the closed malleable lugs 6.

The anti-frictional bearing and connecting member comprises annular race collars 10 and 11, the latter fitted in the former and forming a seat for the headed end of the shank 8. A plurality of anti-frictional balls 12 are arranged between the race collars and said collars are retained in position by an annular shell 13 having the ends thereof flanged, as at 14. The anti-frictional and connecting member is a self-contained unit that can be easily and quickly placed upon the hook member and positioned within the housing of the eye member.

I attach considerable importance to the simplicity of the ball bearing swivel, insomuch that with one operation the eye member is prepared to receive the shank of the hook member, and said hook member can be easily prepared to receive the anti-frictional bearing and connecting member, which is housed in the eye member to permit of the hook member freely revolving relatively thereto.

One embodiment of my invention has been illustrated, but is to be understood that the structural elements are susceptible to such variations and modifications as fall within the scope of the appended claims.

What I claim is:—

1. A swivel comprising an eye member and a hook member, a housing formed integral with said eye member and having a bottom wall, end walls and malleable side walls bent onto said end walls to close the top of said housing, and anti-frictional means arranged within said housing and supporting said hook member.

2. A ball bearing swivel comprising an eye member and a hook member, a cylindrical housing formed integral with said eye member and having the top thereof closed by malleable lugs, said hook member having a shank extending through one of the walls of said housing, and an anti-frictional bearing within said housing and retaining the shank of said hook member therein.

3. A swivel comprising an eye member and a hook member, a housing forming part of said eye member and having parallel end walls, a bottom wall, malleable lugs bent upon said end walls to close said housing, one of said walls having a slot formed therein, said hook member having a shank extending through the slot of said end wall into said housing, and means within said housing to retain the end of the shank therein.

4. A ball bearing swivel comprising members, a housing forming part of one of said members and having end walls and a bottom wall terminating in malleable lugs bent to engage said end walls and form the top wall of said housing, one of said end walls having a slot to receive the end of the other member, and anti-frictional means interposed between the walls of said housing and the end of said member.

In testimony whereof I affix my signature in presence of two witnesses.

NATHAN E. SHERWOOD.

Witnesses:
 OTTO F. BARTHEL,
 ANNA M. DORR.

Copies of this patent may be obtained for five cents each, by addressing the "Commissioner of Patents, Washington, D. C."